United States Patent
Droz (10) Patent No.: US 10,436,906 B2
(45) Date of Patent: Oct. 8, 2019

(54) HYBRID DIRECT DETECTION AND COHERENT LIGHT DETECTION AND RANGING SYSTEM

(71) Applicant: Waymo LLC, Mountain View, CA (US)

(72) Inventor: Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 349 days.

(21) Appl. No.: 15/390,454

(22) Filed: Dec. 23, 2016

(65) Prior Publication Data

US 2018/0180739 A1    Jun. 28, 2018

(51) Int. Cl.
*G01S 17/58* (2006.01)
*G01S 7/487* (2006.01)
*G01S 17/02* (2006.01)
*G01S 17/10* (2006.01)

(52) U.S. Cl.
CPC ............ *G01S 17/58* (2013.01); *G01S 7/487* (2013.01); *G01S 17/026* (2013.01); *G01S 17/10* (2013.01)

(58) Field of Classification Search
CPC ........ G01S 7/4802; G01S 17/58; G01S 17/89; G01C 3/08; G06K 9/3241
See application file for complete search history.

(56) References Cited

U.S. PATENT DOCUMENTS

| | | | |
|---|---|---|---|
| 5,835,199 A | 11/1998 | Phillips et al. | |
| 5,847,816 A | 12/1998 | Zediker et al. | |
| 7,948,610 B2 | 5/2011 | Hintz et al. | |
| 2011/0037965 A1* | 2/2011 | Hintz | G01S 7/4802 356/4.01 |
| 2015/0015869 A1* | 1/2015 | Smith | G01S 17/023 356/28.5 |

(Continued)

FOREIGN PATENT DOCUMENTS

| | | |
|---|---|---|
| WO | 2004/025324 | 3/2004 |
| WO | 2007124063 | 11/2007 |
| WO | 2016033036 | 3/2016 |

OTHER PUBLICATIONS

International Search Report and Written Opinion, International Application No. PCT/US2017/067659, dated Apr. 5, 2018.

(Continued)

*Primary Examiner* — Luke D Ratcliffe
(74) *Attorney, Agent, or Firm* — McDonnell Boehnen Hulbert & Berghoff LLP (57) ABSTRACT

The present disclosure relates to systems and methods for determining a range and relative speed of objects in an environment. An example method includes causing a laser light source to emit a plurality of light pulses, both incoherent and coherent. The light pulses interact with an environment to provide reflected light pulses. The method includes providing a local oscillator signal based on a coherent light pulse. The method also includes receiving, at a detector, the reflected light pulses, and the local oscillator signal. The method additionally includes determining, based on at least one of the reflected light pulses, a presence of an object in the environment. The method yet further includes determining, based on another reflected light pulse and the local oscillator signal, a relative speed of the object with respect to the detector.

19 Claims, 9 Drawing Sheets

(56) References Cited

U.S. PATENT DOCUMENTS

| | | |
|---|---|---|
| 2015/0192676 A1 | 7/2015 | Kotelnikov et al. |
| 2016/0139266 A1 | 5/2016 | Montoya et al. |
| 2016/0291134 A1 | 10/2016 | Droz et al. |
| 2017/0153319 A1* | 6/2017 | Villeneuve .............. G01S 17/00 |
| 2018/0301874 A1* | 10/2018 | Burroughs .............. G01S 17/89 |

OTHER PUBLICATIONS

Wood, Sidney A., George David Emmitt, and Steven Greco. "DLSM: A coherent and direct detection lidar simulation model for simulating space-based and aircraft-based lidar winds." Laser Radar Technology and Applications V. vol. 4035. International Society for Optics and Photonics, p. 1-13 (2000).

* cited by examiner

HYBRID DIRECT DETECTION AND COHERENT LIGHT DETECTION AND RANGING SYSTEM

BACKGROUND

Unless otherwise indicated herein, the materials described in this section are not prior art to the claims in this application and are not admitted to be prior art by inclusion in this section.

Conventional light detection and ranging (LIDAR) systems are configured to emit laser light pulses into an environment of the system. Objects within the environment may reflect the laser light pulses. At least a portion of the reflected light may be detected as received light pulses by a receiver portion of the LIDAR system. Distances to the objects within the environment may be determined based on respective time delays between the emitted light pulses and corresponding received light pulses.

Optical heterodyne detection includes a non-linear optical mixing of an unmodulated signal and a signal modulated at a local oscillator frequency. The non-linear optical mixing may occur when detecting the superimposed optical signals at a square-law detector. The detection process produces signals at the sum and difference frequencies of the unmodulated signal and the modulated signal.

SUMMARY

The present disclosure generally relates to an optical system. The optical system may be configured to emit and detect both coherent and incoherent laser light pulses. In such a scenario, the optical system may provide information indicative of distances and relative speeds of objects within an environment of the system.

In a first aspect, a system is provided. The system includes a photodetector. The photodetector is configured to receive light from an environment of the system. The system also includes a laser light source. The laser light source is configured to emit laser light into the environment. The laser light source is configured to provide a local oscillator signal to the photodetector. The system also includes a controller with at least one processor and a memory. The at least one processor is configured to execute instructions stored in the memory so as to carry out operations. The operations include causing the laser light source to emit a first light pulse. The first light pulse is an incoherent light pulse. The first light pulse interacts with the environment to provide a first reflected light pulse. The operations include causing the laser light source to emit a second light pulse. The second light pulse is a coherent light pulse. The second light pulse interacts with the environment to provide a second reflected light pulse. The operations include receiving, at the photodetector, the first reflected light pulse, the second reflected light pulse, and the local oscillator signal. The operations yet further include determining, based on the first reflected light pulse, a presence of an object in the environment. The operations also include determining, based on the second reflected light pulse and the local oscillator signal, a relative speed of the object with respect to the system.

In a second aspect, a method is provided. The method includes causing a laser light source to emit a first light pulse. The first light pulse is an incoherent light pulse. The first light pulse interacts with an environment to provide a first reflected light pulse. The method also includes causing the laser light source to emit a second light pulse. The second light pulse is a coherent light pulse. The second light pulse interacts with the environment to provide a second reflected light pulse. The method also includes providing a local oscillator signal based on the second light pulse. The method additionally includes receiving, at a photodetector, the first reflected light pulse, the second reflected light pulse, and the local oscillator signal. The method yet further includes determining, based on the first reflected light pulse, a presence of an object in the environment. The method also includes determining, based on the second reflected light pulse and the local oscillator signal, a relative speed of the object with respect to the photodetector.

In a third aspect, a method is provided. The method includes causing a laser light source to emit a plurality of light pulses. The plurality of light pulses includes at least one incoherent light pulse and at least one coherent light pulse. The plurality of light pulses interacts with an environment to provide a plurality of reflected light pulses. The method also includes providing a local oscillator signal based on the at least one coherent light pulse. The method additionally includes receiving, at a photodetector, the local oscillator signal and at least some of reflected light pulses of the plurality of reflected light pulses. The method yet further includes determining, based on reflected light pulses corresponding to the at least one incoherent light pulse, a presence of an object in the environment. The method also includes determining, based on reflected light pulses corresponding to the at least one coherent light pulse and the local oscillator signal, a relative speed of the object with respect to the photodetector.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

An optical system includes at least one laser light source. In an example embodiment, multiple laser light sources may be used in various combinations in a master optical power amplifier (MOPA) fiber laser configuration. For example, a seed laser and a pump laser may provide short pulses (2-4 ns) of light with relatively short coherence length at high power (15 W average power) and 1550 nm wavelength. These pulses are described herein as "incoherent" pulses. It is understood that other combinations of pulse length, average power, and wavelength are possible. Furthermore, the local oscillator and the pump laser may provide relatively longer pulses (e.g., 8 microseconds or more) of light with relatively longer coherence length at relatively lower power (e.g., 1 watt average power). These pulses are described herein as "coherent" pulses. In some embodiments, the seed laser and local oscillator light sources may be combined via a 90%-10% fiber combiner coupled to a single mode fiber. However, other ways to optically couple the several light sources are possible.

The optical system also includes a receiver system. The receiver system may include an array of photodetectors (e.g., a single photon avalanche detector (SPAD) array) and a read out integrated circuit (ROIC) (e.g., an application specific integrated circuit (ASIC)), which may amplify/filter signals from the respective photodetectors. As such, in an example embodiment, the receiver system may be configured to receive the incoherent light pulses so as to provide information indicative of a time of flight of the received incoherent light pulses. From the time-of-flight information, the received incoherent light pulses may provide ranging information (e.g., similar or identical to a conventional LIDAR system).

At least a portion of the light generated from the local oscillator may be directed toward the SPAD array. In such a scenario, the coherent light received at the SPAD array may combine in a non-linear fashion (e.g., via homodyne or heterodyne mixing) to form a beat frequency signal. As such, each photodetector element of the SPAD array may be considered a non-linear mixing element. The beat frequency signal may provide information about an object (from which the light pulse was reflected) moving relative to the optical system based on a Doppler technique. For example, the beat frequency of a slow moving object (e.g., 0.1 m/s) may be around 125 kHz, whereas a fast-moving object (e.g., 20 m/s) may have a beat frequency of 40 MHz. As such, the optical system may be configured to provide information about moving objects in an environment proximate to the optical system. In an example embodiment, the beat frequency of the homodyne or heterodyne signal may be determined by converting the signal to a digital form (e.g., with an analog-to-digital converter) and detecting the waveform frequency using a digital detection method. Additionally or alternatively, the beat frequency may be detected by a phase locked loop (PLL) and/or a lock-in amplifier. Other ways of obtaining coherent pulse information via non-linear mixing are contemplated.

In some embodiments, the ROIC or other computational elements of the optical system may include various combinations of amplifiers, filters, sample and hold circuits, and/or comparators. In such a scenario, the ROIC may provide functions similar or identical to a sampling oscilloscope (e.g., a logarithmic transimpedance amplifier (TIA), a low-pass filter (LPF), a sample and hold circuit, and/or a comparator). Other methods and systems that provide sampled data of slowly varying signals (beat frequencies) are contemplated.

The "incoherent" and "coherent" laser pulses may be emitted in an interleaved fashion. For example, for each short "incoherent" laser pulse emitted, a single, long "coherent" laser pulse may be emitted. Alternatively, for every 10 incoherent pulses, 1 coherent laser pulse may be emitted. Other interleaved pulse trains are possible.

In an example embodiment, the local oscillator may have a very high Q (quality factor). For example, the Q of the local oscillator may be 1 million or more, so as to provide a coherence length on the order of 100 meters. The local oscillator may include a telecommunications-grade diode laser, an external cavity distributed feedback (DFB) laser, a whispering gallery mode oscillator/laser, or a vertical cavity surface emitting laser (VCSEL).

In some embodiments, the local oscillator signal may be "chirped." That is, the wavelength of the local oscillator may be intentionally adjusted in a predetermined fashion. As such, ranging information may be obtained by detecting a temporal position of the chirped return signal.

II. Example Systems

Figure 1:
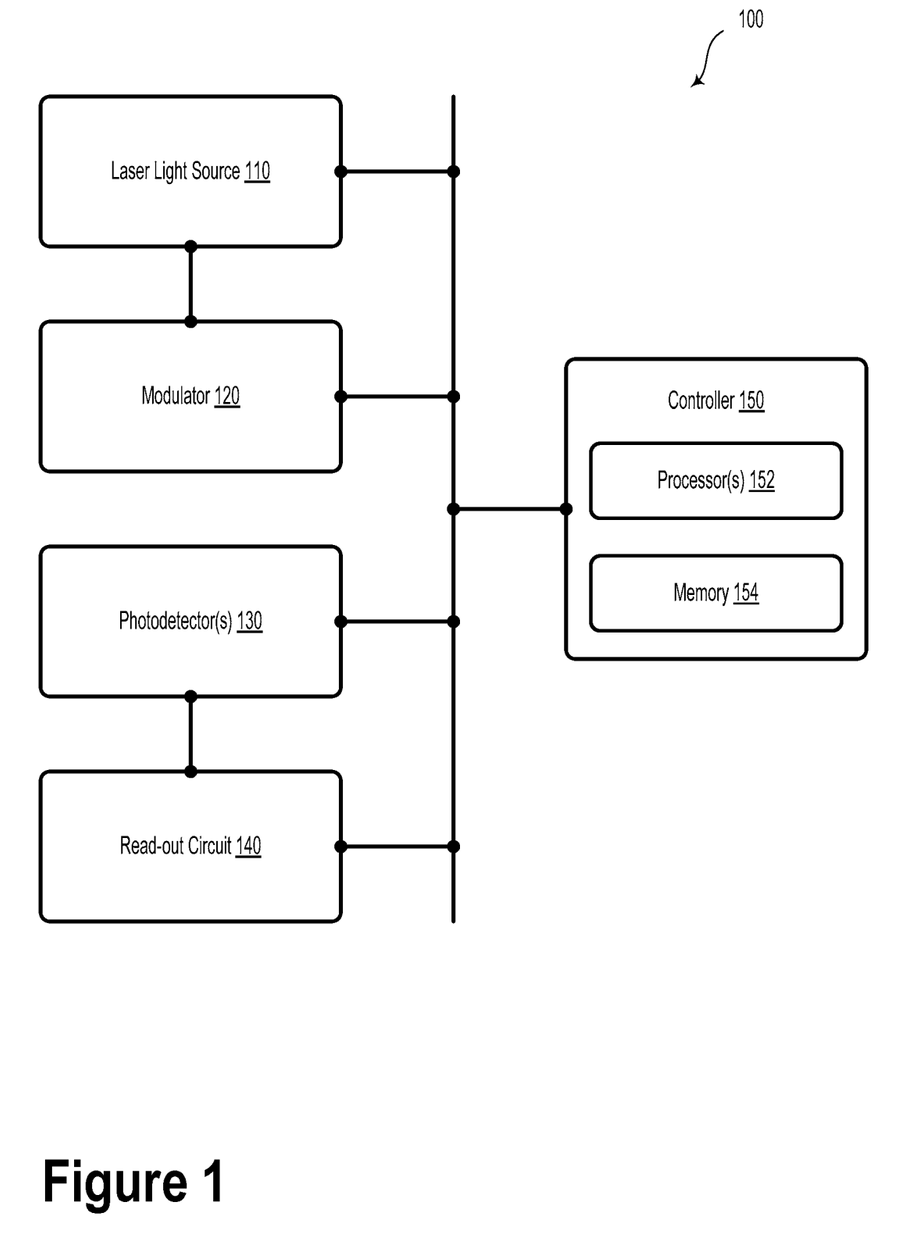
FIG. 1 illustrates a system, according to an example embodiment.

FIG. 1 illustrates a system 100, according to an example embodiment. System 100 includes at least one laser light source 110, one or more photodetectors 130, a read-out circuit 140, and a controller 150. System 100 may include a modulator 120. System 100 may be at least a portion of a light distance and ranging (LIDAR) system. That is, the system 100 may be configured to interact with an environment. In some embodiments, as described herein, system 100 may provide location and relative velocity information about objects in the environment (e.g., vehicles, buildings, landmarks, animals, etc.).

In some embodiments, the laser light source 110 is configured to emit laser light into an environment around the system 100. The laser light source 110 is configured to provide a local oscillator signal to the one or more photodetectors 130. For example, the emitted laser light from the laser light source 110 may be split into two portions. A first portion (e.g., 10% of total laser power) of emitted laser light may be utilized as a local oscillator signal. A second portion (e.g., 90%) of emitted laser light may be emitted into the environment around the system 100.

In a homodyne detection operating mode, the first portion of emitted laser light may be incident directly onto the photodetectors 130. In such a scenario, the second portion of emitted laser light may be mixed with reflected light from the environment when they interact with the photodetectors 130. Such direct mixing may provide a homodyne signal.

In a heterodyne detection operating mode, the first portion of emitted laser light may be modulated via modulator 120 before being directed toward the photodetectors 130, as described elsewhere herein.

In an example embodiment, the laser light source 110 may be a single mode laser. For instance, the laser light source 110 may include a laser configured to provide emission light having a wavelength about 1550 nanometers. Furthermore, other low phase noise, single mode, single wavelength light sources are possible. Other wavelengths in the near infrared (e.g., 0.7-2.0 microns), are possible and contemplated. In an example embodiment, a wavelength of emission light may be selected and/or controlled based on considerations such as environmental conditions, obstacle density/location, vehicle speed, etc.

In some embodiments, the laser light source 110 may include a plurality of light sources. For instance, the plurality of light sources may include several laser light sources with different emission wavelengths (or tunable emission wavelength). In such a scenario, the laser light source 110 and/or the tuned emission wavelength may be selected based on a need for a desired emission wavelength.

In some embodiments, the laser light source 110 may include a master optical power amplifier (MOPA) fiber laser, wherein the MOPA includes a seed laser and a pump laser configured to emit light pulses of at least 15 watts average power and at an emission wavelength of about 1550 nm. It will be understood that other average powers and emission wavelengths are possible and contemplated herein.

The laser light source 110 may be optically coupled to the modulator 120 by free-space, a fiber optic coupling, a waveguide, and/or a beam splitter. The modulator 120 is configured to controllably modulate at least the second portion of the light emitted by the laser light source 110.

In some embodiments, the modulated light from the modulator 120 may provide a local oscillator signal for a heterodyne detection process. Namely, the local oscillator signal may be mixed with laser light reflected from the environment to provide a heterodyne signal.

The modulator 120 may be configured to shift an optical frequency of the second portion of the light emitted by the laser light source 110. In some embodiments, the modulator 120 may shift a frequency of the emitted laser light within a range of 1 MHz to 100 MHz (e.g., 40 MHz). Other frequency shifts are contemplated herein.

In some embodiments, modulator 120 may be a refractive modulator. As such, the refractive modulator may include a material having a modifiable refractive index. For example, the refractive modulator may adjust its refractive index via the acousto-optic effect or the electro-optic effect. In such examples, the refractive modulator may be a traveling wave acousto-optic modulator (AOM) or an electrooptic modulator (EOM).

Alternatively, the modulator 120 may be a spatial light modulator (SLM) configured to modify a phase of incident light.

In some embodiments, the modulator 120 may modulate incoming light according to various transfer functions. For example, the modulator 120 may modulate the phase of incoming light according to a sine wave modulation input signal. Alternatively, the modulation input signal may include a linear sawtooth wave. In such a scenario, the modulator 120 may modulate the incoming light according to serrodyne phase modulation.

Alternatively, the modulator 120 may be an absorptive modulator. In such a scenario, the absorptive modulator may include a material having a modifiable absorption coefficient. For example, the absorptive modulator may be an electro-absorptive modulator (EAM). Additionally or alternatively, the modulator 120 may include other ways to modulate a frequency, duration, or another aspect of the second portion of the emitted laser light so as to provide the local oscillator signal.

The photodetectors 130 are configured to receive light from an environment of the system 100. The photodetectors 130 may include one or more single photon avalanche detectors (SPADs). In some embodiments, the photodetectors 130 may include an avalanche photodiode (APD), a complementary metal oxide semiconductor (CMOS) detector, or a charge-coupled device (CCD). For example, the photodetectors 130 may include indium gallium arsenide (InGaAs) APDs configured to detect light at wavelengths around 1550 nm. Other types of photodetectors are possible and contemplated herein.

The photodetectors 130 may include a plurality of photodetector elements disposed in a one-dimensional array or a two-dimensional array. In an example embodiment, the photodetectors 130 may include sixteen detector elements arranged in a single column (e.g., a linear array). For example, the detector elements could be arranged along, or could be at least parallel to, a primary axis. It will be understood that other arrangements of the respective detector elements are possible. For instance, the detector elements could be arranged in two columns that are parallel to a primary axis.

In an example embodiment, each detector element could be substantially square with a 350 micron side length. Furthermore, the detector pitch could be 400 microns along the primary axis. That is, a center-to-center distance between neighboring detector elements could be 400 microns. Put another way, assuming a 350 micron detector side length, when arranged along the primary axis, the detector elements may have 50 microns between them. It will be understood that other values for the detector pitch are possible and contemplated. For example, with smaller detector elements, detector pitches of less than 50 microns are possible.

In example embodiments, the photodetectors 130 may act as one or more nonlinear mixers. For example, the photodetectors 130 may be configured to mix the received reflected light with the local oscillator signal to provide a beat frequency. The beat frequency may provide information about a relative speed of an object in the environment as described herein.

System 100 may include one or more further optical components. For example, system 100 may include beam splitters and/or optical couplers. The optical components may be configured to modify, direct, and/or absorb light as described herein. For example, in a fiber optic setup, one or more fiber couplers may be used. Furthermore, the optical fibers may be single mode fibers. Additionally, the system 100 may include various optical components to provide mode matching at the photodetectors 130. That is, in order to achieve proper optical heterodyne mixing between the optical signal received from the sample and the local oscillator signal, optical components may be selected so as to maintain mode matching across at least some of the photodetectors 130. Other optical elements, such as optical filters, lenses, apertures, and shutters may be implemented in system 100.

The read-out circuit 140 may include at least one of an application-specific integrated circuit (ASIC) or a field-programmable gate array (FPGA), such as a Xilinx XCVU3P Virtex UltraScale+ FPGA. For instance, the signal receiver circuit 140 may represent an amplifier or another type of analog front end system configured to receive respective photosignals from the photodetectors 130. Additionally or alternatively, the read-out circuit 140 may include a read-out integrated circuit (ROIC).

The read-out circuit 140 may carry out a variety of other functions including, but not limited to, signal routing/selection (e.g., switch, multiplexer, or demultiplexer), and signal processing (e.g., denoising, decoding, or encoding). The read-out circuit 140 may additionally or alternatively be configured to provide various image processing tasks based on the received photosignals (e.g., time averaging). In an example embodiment, the read-out circuit 140 could include a transimpedance amplifier (TIA), such as a Maxim MAX 3658 low noise TIA. In other embodiments, the TIA may be embedded in a custom ASIC or ROIC.

The controller 150 includes at least one processor 152 and a memory 154. The processor is configured to execute instructions stored in the memory 154 so as to carry out operations.

The operations include causing the laser light source 110 to emit a first light pulse. The first light pulse is an incoherent light pulse. In some embodiments, the first light pulse includes a ranging pulse. The ranging pulse is between 2 nanoseconds and 5 nanoseconds in duration. The first light pulse interacts with the environment to provide a first reflected light pulse.

The operations also include causing the laser light source 110 to emit a second light pulse. The second light pulse is a coherent light pulse. For example, the second light pulse may include a Doppler pulse. In such a scenario, the Doppler pulse may be between 125 nanoseconds and 8 microseconds in duration. Furthermore, the second light pulse interacts with the environment to provide a second reflected light pulse.

The operations also include receiving, at the photodetector(s) 130, the first reflected light pulse, the second reflected light pulse, and the local oscillator signal.

The operations include controller 150 determining, based on the first reflected light pulse, a presence of an object in the environment. Further, the first reflected light pulse may be used to determine a distance to the object in the environment based on, for example, a time of flight of the emitted laser light.

The controller 150 may be configured to determine the beat frequency of the heterodyne signal and/or homodyne signal. For example, the beat frequency may be a sum or difference frequency between the second reflected light pulse and the local oscillator signal.

The operations additionally include determining, based on the beat frequency, a relative speed of the object with respect to the system. That is, the determined beat frequency of the heterodyne signal may be used by controller 150 to determine the relative speed of the object. For example, the relative velocity of an object may be calculated or approximated as: $v_{object} \propto$ $$c\left(\frac{f}{f_0}\right),$$

where f is the beat frequency and $f_0$ is the frequency of the emitted laser light. In some embodiments, determining the beat frequency may be obtained using a phase-locked loop (PLL), a lock-in amplifier, or a fast Fourier transform (FFT) analysis.

Figure 2:
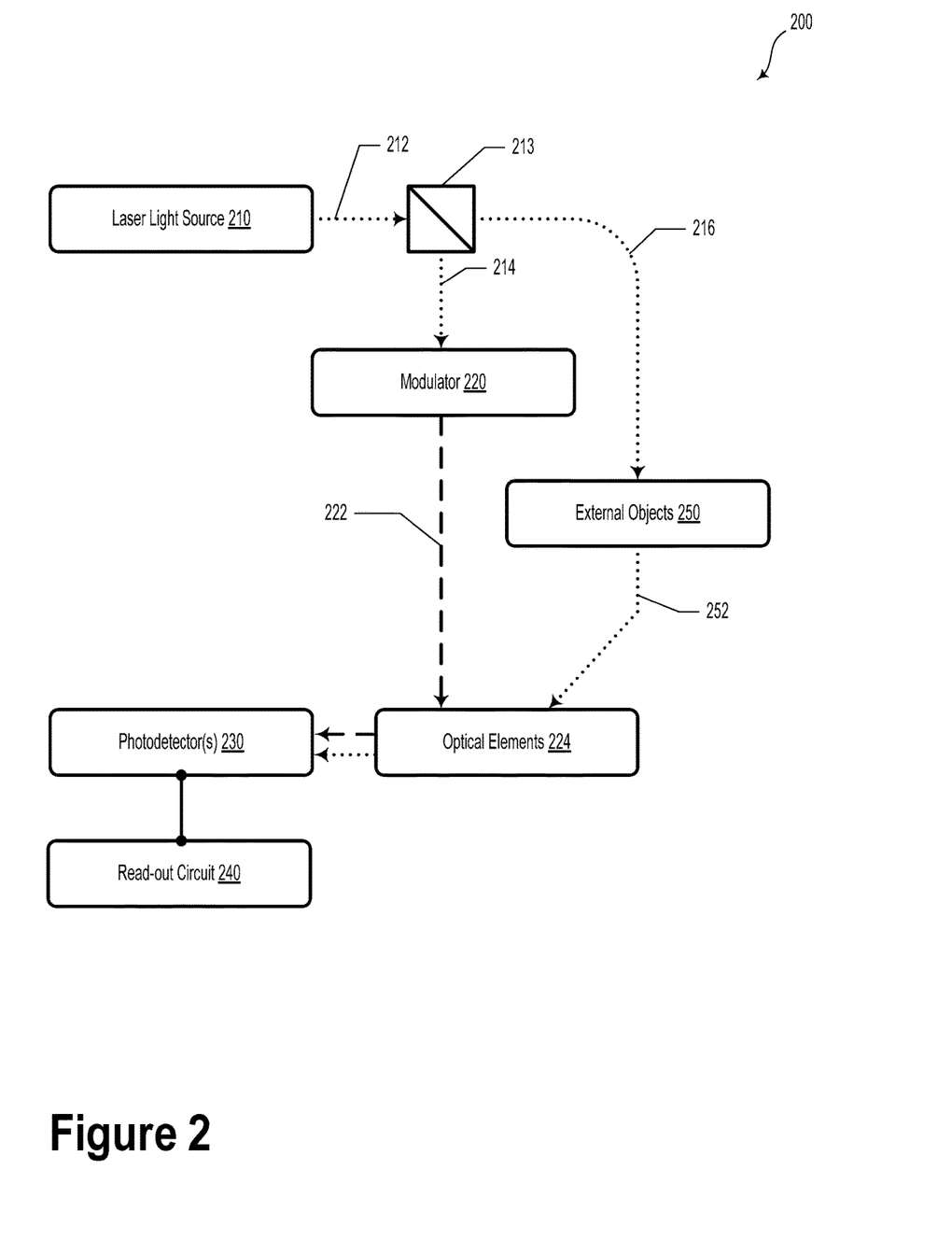
FIG. 2 illustrates a system, according to an example embodiment.

FIG. 2 illustrates a system 200, according to an example embodiment. At least some elements of system 200 may be similar or identical to the corresponding elements of system 100 as illustrated and described in reference to FIG. 1. System 200 includes a laser light source 210, a beam splitter 213, a modulator 220, optical elements 224, photodetector(s) 230, and a read-out circuit 240.

The laser light source 210 may include a fiber laser or another type of laser source.

The optical elements 224 may include, without limitation, polarization-maintaining optical fibers, collection optics, mirrors, couplers, and other elements configured to collect light from an environment around the system 200. In some embodiments, the optical elements 224 could include micro-Fresnel lenses, which may focus light by refraction in a set of concentric curved surfaces. Yet further, the optical elements 224 may be include binary optics. Such binary optical elements may resemble a stepped arrangement of optical materials.

The photodetectors 230 may be optically-coupled to an environment around the system 200 and the modulator 220. In an example embodiment, the photodetectors 230 may be optically-coupled to the environment and the modulator 220 via optical elements 224. It is understood that other optical arrangements are possible so as to enable the photodetectors 230 to detect light from a field of view of the environment as well as from the local oscillator signal.

In example embodiments, the laser light source 210 may produce emitted laser light 212. The emitted laser light 212 may interact with beam splitter 213 so as to separate the emitted laser light 212 into at least two portions. A first portion 214 of emitted laser light may be modulated by modulator 220 to provide a local oscillator signal 222. A second portion 216 of emitted laser light may interact with external objects 250, which may be present in the environment around system 200. At least some of the second portion 216 of emitted laser light may be reflected from the external objects 250 to provide a reflected light signal 252. The reflected light signal 252 may be collected via the optical elements 224.

The local oscillator signal 222 and the reflected light signal 252 may interact with the photodetectors 230. Namely, the photodetectors 230 may provide a "square-law" mixing function on the superimposed local oscillator signal 222 and the reflected light signal 252. That is, a detector signal, D, generated by the photodetectors 230 is proportional to the square of the electric field amplitude of the light incident on the photodetectors 230. As an example, in the case of two polarization-matched, sinusoidally-varying coherent (e.g. in phase) optical signals coincident on the photodetectors 230, namely $S_{reflected}$ (e.g., the reflected light signal 252) and $S_{LO}$ (e.g., the local oscillator signal 222), the detector signal may be expressed as a superposition of the two optical signals:

$$D \propto \int (S_{reflected} + S_{LO})^2 dt.$$

In some embodiments, the read-out circuit 240 may be configured to determine a beat frequency the detector signal. The beat frequency may be within a frequency range between 10 kHz to 100 MHz. However, other beat frequencies, and frequency ranges are possible. For example, a frequency range may be based on one or more relative speeds of interest. In some embodiments, relative speeds of interest may include speeds within a range between 0.1 m/s (e.g., a walking pedestrian) to 90 m/s (vehicle traveling on the opposite side of a highway). Greater or lesser speeds may also be of interest.

In the scenario where the emitted laser light has a wavelength of 1550 nm, 0.1 m/s may correspond to a beat frequency of about 66 kHz and 90 m/s may correspond to a beat frequency of 58 MHz. Accordingly, in some embodiments, system 200 may be configured to determine beat frequencies of the detector signal within a frequency range between about 66 kHz and 58 MHz. It will be understood that other relative speeds and/or other corresponding beat frequencies are possible and contemplated.

In an example embodiment, the read-out circuit 240 may be used to distinguish movement direction relative to the system 200 based on a Doppler shift of the reflected light signal 252. That is, the read-out circuit 240 may be used to disambiguate "approaching" and "retreating" objects (e.g., vehicles moving towards and away from the system 200).

While FIG. 2 illustrates system 200 as having a particular arrangement of elements, other arrangements are possible. Additionally or alternatively, some elements of system 200 may be combined and/or rearranged. For example, some types of optical modulators (e.g., an acousto-optical modulator (AOM)) may function as both a frequency shifter/modulator and a beam splitter at the same time. Furthermore, the local oscillator signal 222 may be generated by a different laser source. Other configurations of the elements of system 200 are possible.

FIGS. 3A, 3B, 3C, 3D, and 3E illustrate various signals and interactions between those signals. Namely, the signals and interactions are provided as examples of which may be transmitted, received, and processed by systems 100 and 200, as illustrated and described with regard to FIGS. 1 and 2.

Figure 3A:
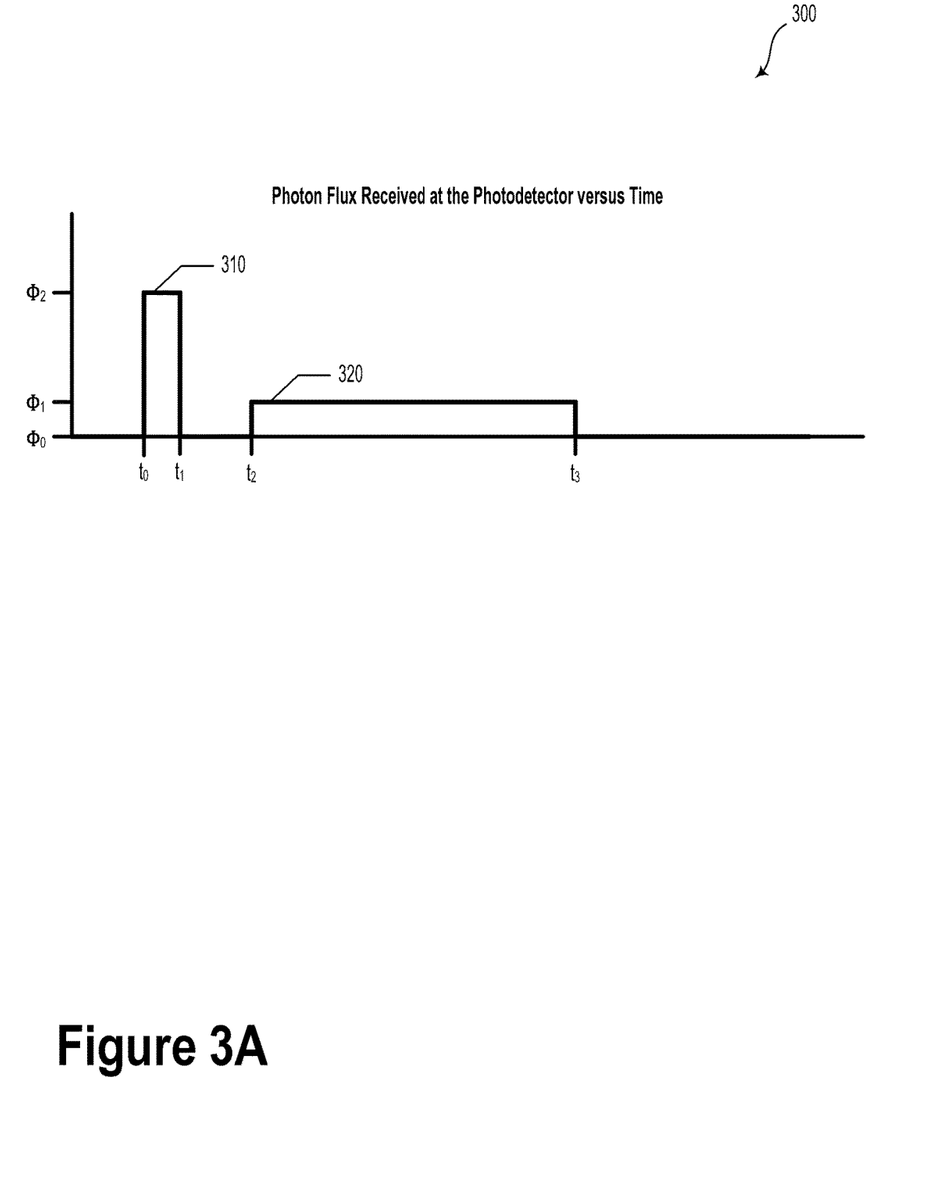
FIG. 3A illustrates a signal, according to an example embodiment.

FIG. 3A illustrates a signal 300, according to an example embodiment. As illustrated in FIG. 3A, signal 300 may represent a photon flux received at a photodetector (e.g., photodetector 230). Namely, signal 300 may include at least two light pulses. A first light pulse 310 may be observed during a relatively shorter time period (e.g., between time $t_0$ and $t_1$) and at a relatively high photon flux of $\Phi_2$. A second light pulse 320 may be observed during a relatively longer time period (e.g., between $t_2$ and $t_3$) and at a relatively low photon flux of $\Phi_1$. At other times illustrated in FIG. 3A, the signal 300 may indicate a flux of $\Phi_0$, which may represent a noise level of the receiver system. It will be understood that relative flux values are used herein because a wide range of absolute flux values may be used in practice based on various parameters of the optical system (e.g., laser wavelength, optics, detector type, detector photon efficiency, detector linearity, detector responsivity, etc.).

In an example embodiment, the first light pulse 310 may represent a reflected return signal from a "ranging pulse", emitted so as to identify a range to an object in the environment. Furthermore, the second light pulse 320 may represent a reflected return signal from a "Doppler pulse", emitted so as to identify a relative speed of the object.

Figure 3B:
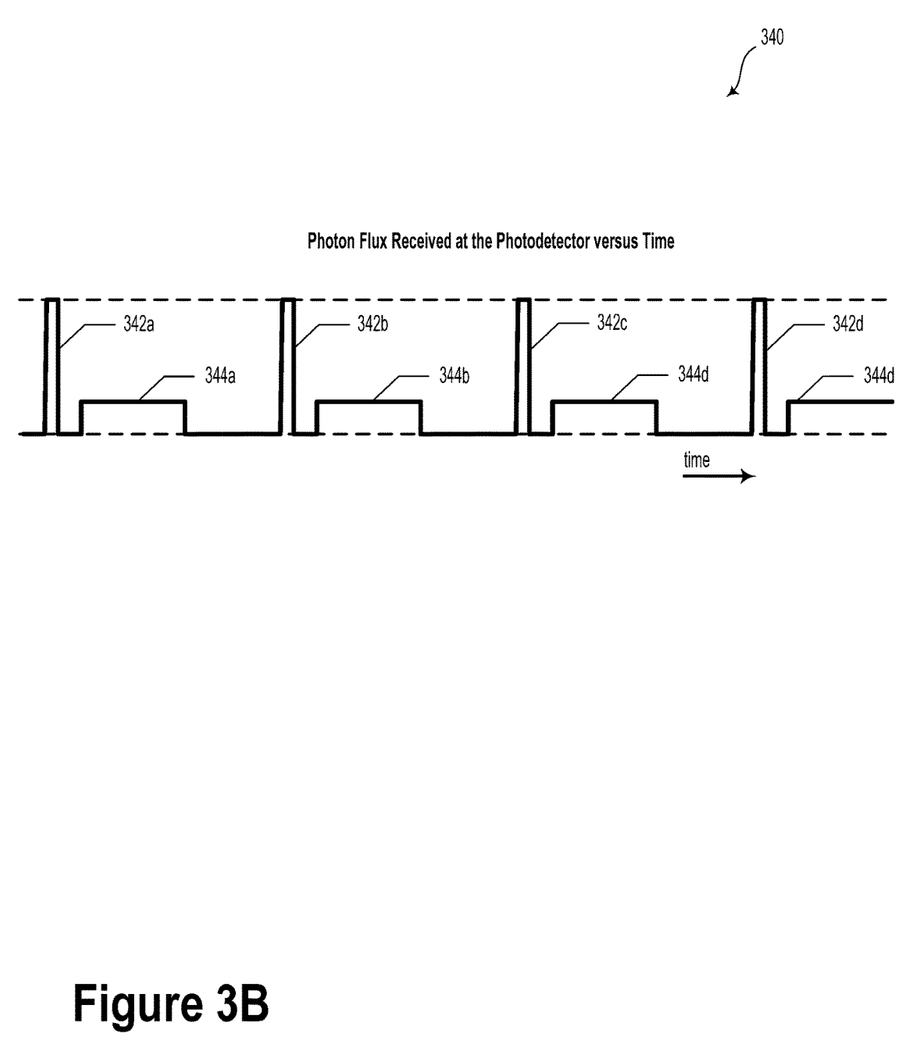
FIG. 3B illustrates a signal, according to an example embodiment.

FIG. 3B illustrates a signal 340, according to an example embodiment. As illustrated in FIG. 3B, signal 340 may include a pulse train of received photon flux at one or more photodetectors of system 100 or 200. Namely, the pulse train may include ranging pulses 342a, 342b, 342c, and 342d and Doppler pulses 344a, 344b, 344c, and 344d. In an example embodiment, the pulse train may include temporally-interleaved ranging pulses and Doppler pulses.

Figure 3C:
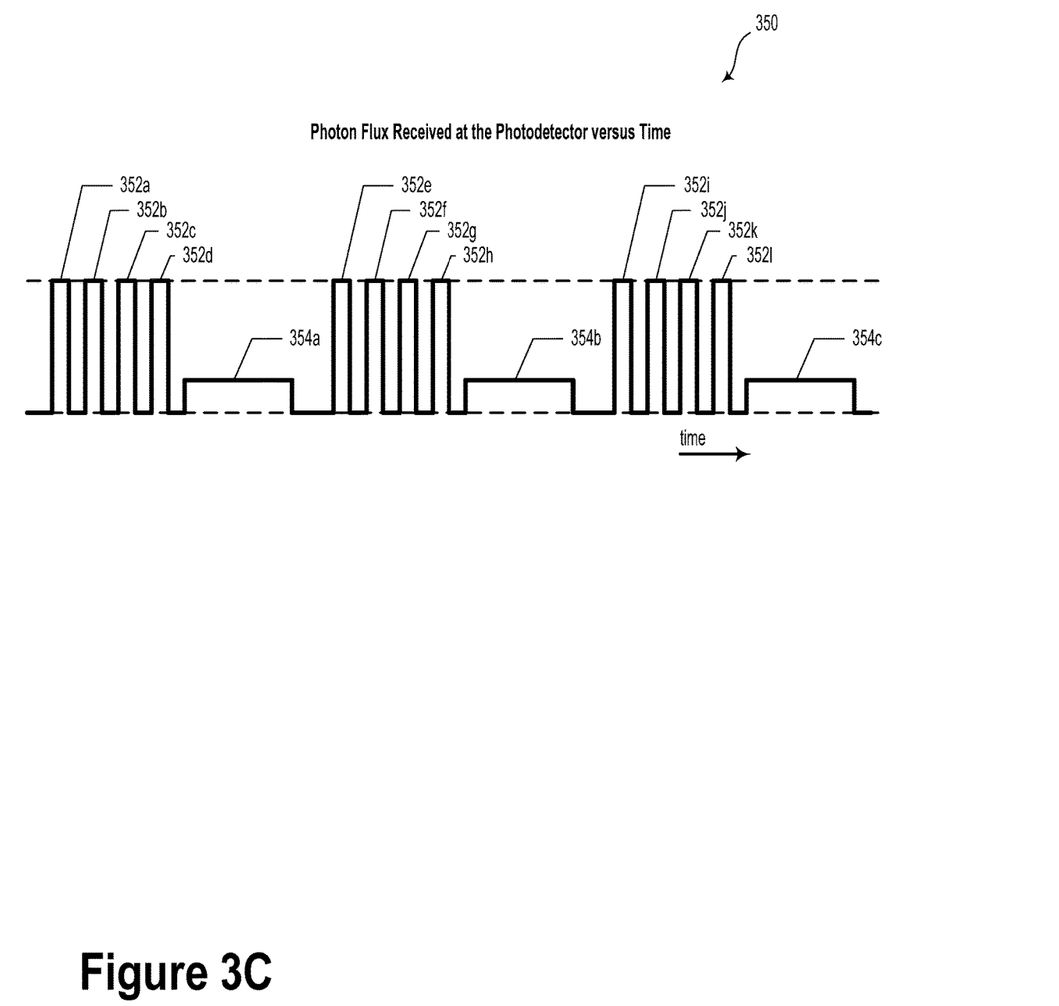
FIG. 3C illustrates a signal, according to an example embodiment.

FIG. 3C illustrates a signal 350, according to an example embodiment. FIG. 3C illustrates a further variation how light may be emitted and received by system 100 or 200. Namely, signal 350 includes a pulse train that includes a first group of four ranging pulses (352a-d) followed by a Doppler pulse 354a, a second group of four ranging pulses (352e-h) followed by a Doppler pulse 354b, and a third group of four ranging pulses (352i-352l) and a Doppler pulse 354c.

Figure 3D:
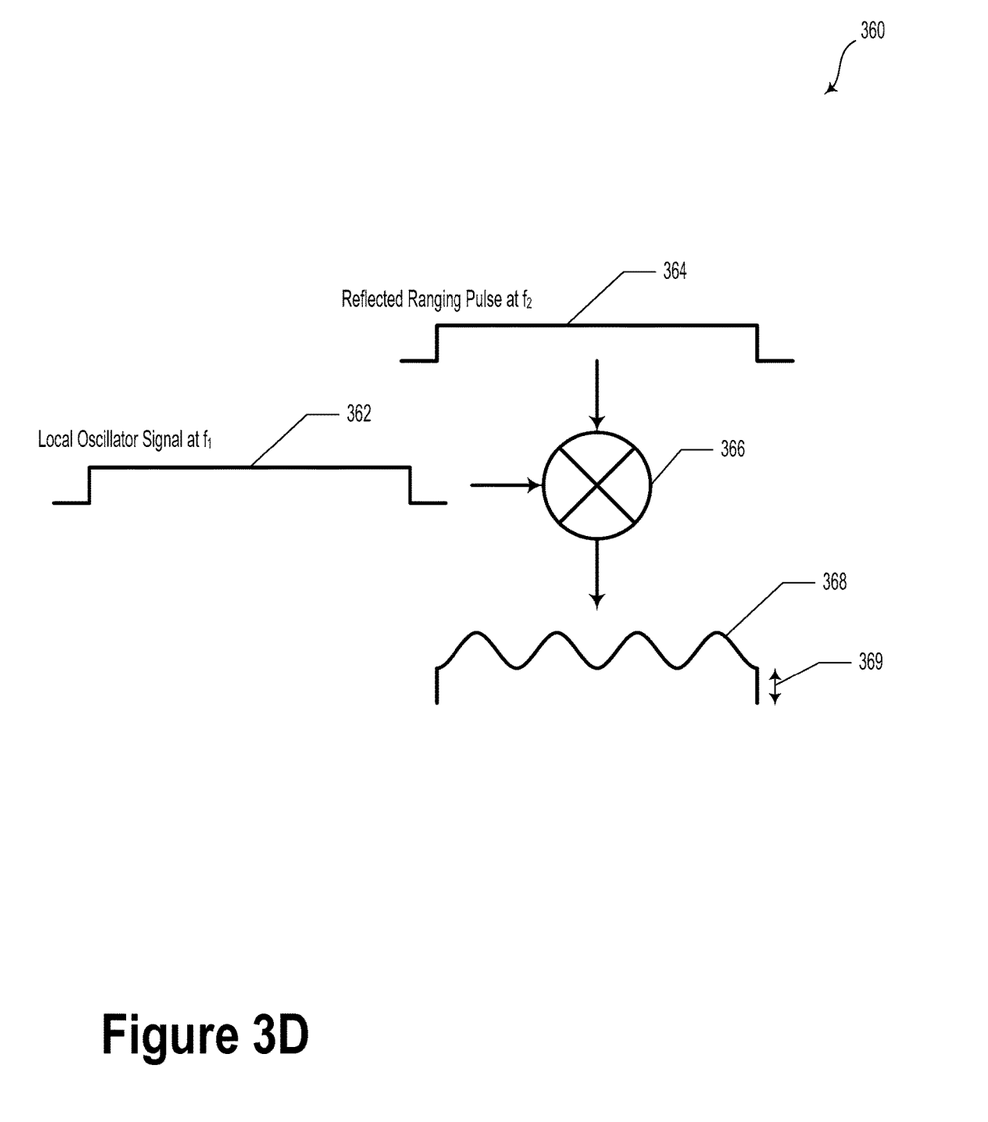
FIG. 3D illustrates a scenario involving several signals, according to an example embodiment.

FIG. 3D illustrates a scenario 360 involving several signals 362, 364, and 368, according to an example embodiment. Signal 362 may represent a local oscillator signal based on a Doppler pulse emitted from the laser light source. In a homodyne detection example, the local oscillator signal may include the Doppler pulse itself (e.g., the unmodulated signal). In a heterodyne detection example, the local oscillator signal may include the Doppler pulse modulated at a predetermined frequency (e.g., 40 MHz). In both cases, the local oscillator signal may have a characteristic optical frequency, $f_1$.

Signal 364 may represent a reflected Doppler pulse that has interacted with a moving object in an environment of system 100 or system 200. Due to interactions between the emitted Doppler pulse and the moving object, the optical frequency, $f_2$, of the reflected Doppler pulse may have shifted (e.g., Doppler-shifted) as compared to the optical frequency of the as-emitted Doppler pulse.

Signal 368 may represent a heterodyne signal, which may be provided by mixing signals 362 and 364 at a mixer 366. Mixer 366 may be a device configured to mix optical signals, such as a square law detector (e.g., photodetectors 130). Signal 368 may include a characteristic beat frequency. Signal 368 may also include an offset amount 369. The beat frequency may be a sum frequency (e.g., $f_{beat}=f_1+f_2$) or a difference frequency (e.g., $|f_{beat}|=f_1-f_2$) of signal 362 and signal 364. The beat frequency may be determined based on a Fourier analysis or via lock-in amplification and/or phase-locked loop methods. Based on the beat frequency, a relative speed of the object in the environment may be determined.

Figure 3E:
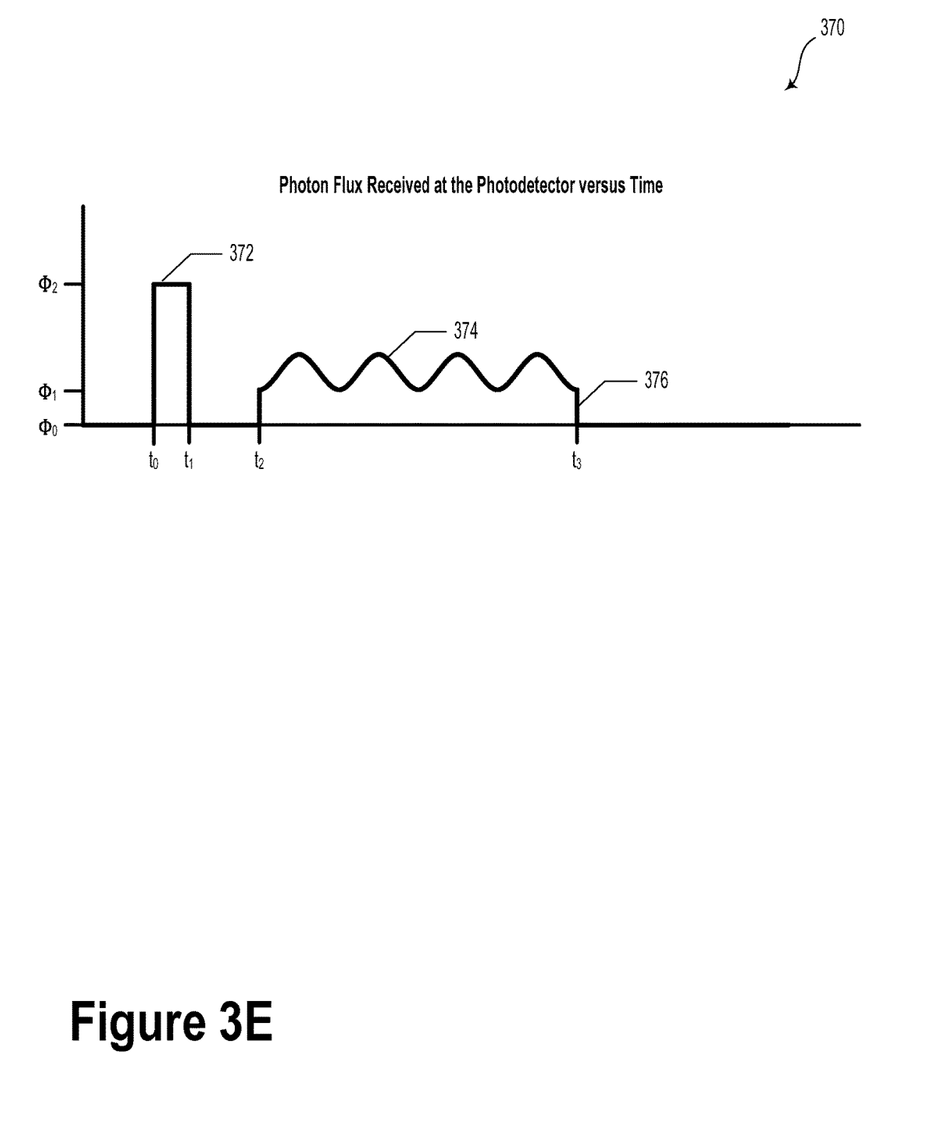
FIG. 3E illustrates a signal, according to an example embodiment.

FIG. 3E illustrates a signal 370, according to an example embodiment. Signal 370 may represent light received by the photodetectors 130. Namely, the photodetectors 130 may receive a ranging pulse 372 between $t_0$ and $t_1$. In some embodiments, a distance between the system 100 or 200 and the reflecting object may be determined based on the amount of time between emitting the ranging pulse and receiving the reflected ranging pulse.

Signal 370 also includes a Doppler pulse 374 that has been photomixed with a local oscillator signal a square law detector. Namely, the Doppler pulse 374 may have a characteristic beat frequency based on a sum or difference frequency between the modulated (or unmodulated, in the case of homodyne detection) optical frequency of the as-emitted Doppler pulse and the optical frequency of the reflected Doppler pulse. In some embodiments, a relative speed of the reflecting object may be determined based on the beat frequency.

As such, a pulse train that includes both ranging pulses and Doppler pulses may be utilized to obtain information about distances to objects in an environment as well as the relative speed of those objects with regard to the system 100 or 200.

III. Example Methods

Figure 4:
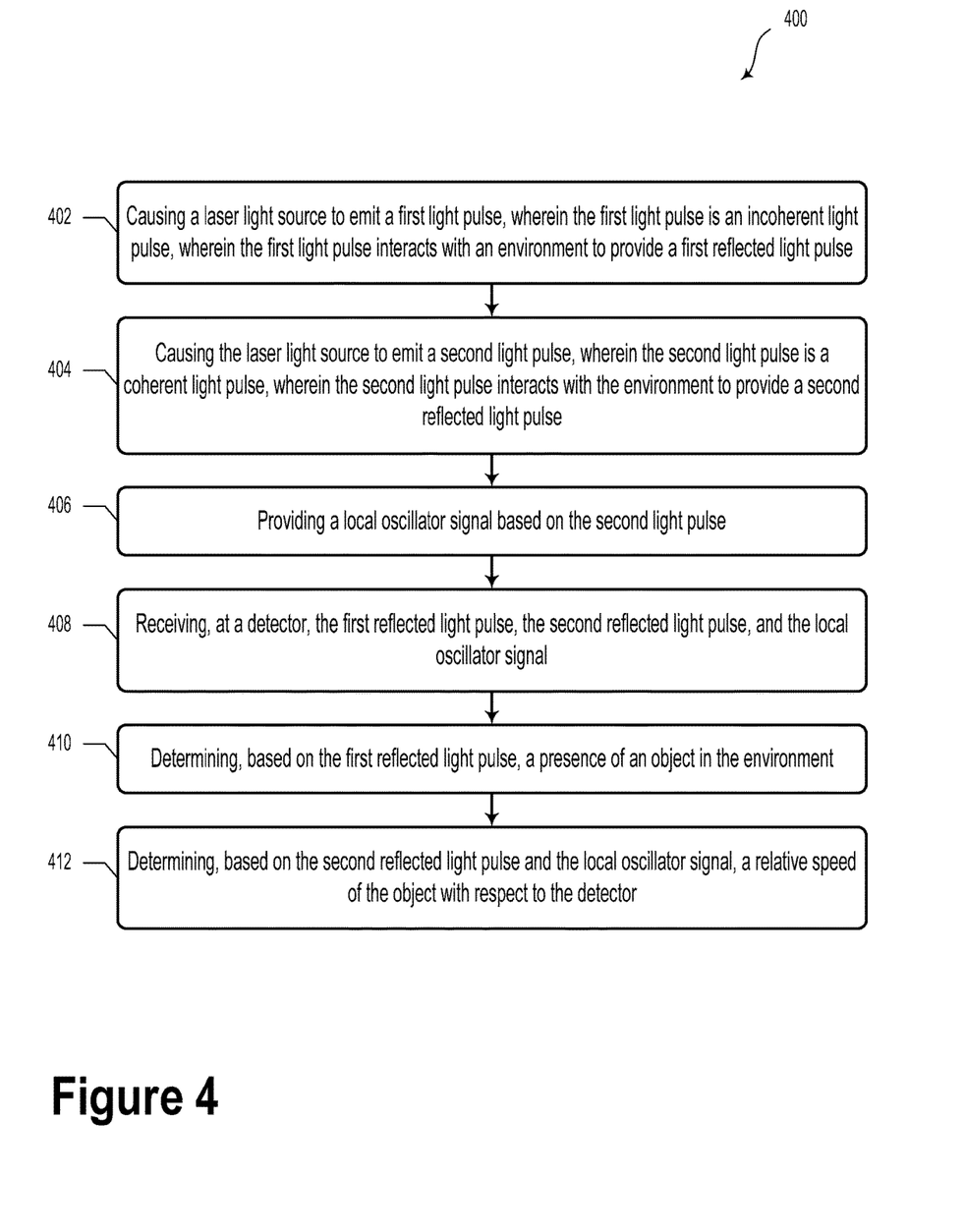
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted or added to method 400.

The blocks of method 400 may be carried out by various elements of the systems 100 and 200 as illustrated and described in reference to FIGS. 1 and 2. Furthermore, method 400 may involve signals such as signals 300, 340, 350, 362, 364, 368, and 370 that are illustrated and described with regard to FIGS. 3A, 3B, 3C, 3D, and 3E.

Block 402 includes causing a laser light source to emit a first light pulse. For example, the incoherent light pulse could have a coherence length that is less than 1 millimeter, which may correspond to a laser linewidth of 2.4 nm or 300 GHz. The first light pulse is an incoherent light pulse. The first light pulse may be a ranging pulse. The ranging pulse is between 2 nanoseconds and 5 nanoseconds in duration. The first light pulse interacts with an environment to provide a first reflected light pulse.

Block 404 includes causing the laser light source to emit a second light pulse. The second light pulse is a coherent light pulse. For example, the coherent light pulse could have a coherence length that is greater than the round trip distance of the laser pulse. That is, to obtain Doppler information for an object 200 meters away, the coherence length of the coherent laser pulse may be greater than 400 meters. Other coherence lengths are possible and contemplated herein. In some embodiments, the second light pulse is a Doppler pulse. In such scenarios, the Doppler pulse may be between 125 nanoseconds and 8 microseconds in duration. Other durations are contemplated. The second light pulse interacts with the environment to provide a second reflected light pulse.

Block 406 includes providing a local oscillator signal based on the second light pulse. The local oscillator signal may be provided by utilizing a phase and/or wavelength modulator (e.g., modulator 120). The modulator could be an acousto-optic modulator or an electro-optic modulator. The modulator is configured to controllably modulate at least the second light pulse based on a reference frequency signal (e.g., 40 MHz) so as to provide modulated light (e.g., frequency and/or phase-shifted light). In a homodyne detection mode, the local oscillator signal may include a portion of the unmodulated coherent light pulse. In a heterodyne detection mode, the coherent light pulse may be modulated according to a predetermined reference frequency. In such a scenario, the local oscillator signal may include the modulated coherent light pulse.

Block 408 includes receiving, at a photodetector, the first reflected light pulse, the second reflected light pulse, and the local oscillator signal. The photodetector (e.g., photodetector 130) may include at least one of: an avalanche photodiode (APD), a photomultiplier tube (PMT), a complementary metal oxide semiconductor (CMOS) detector, or a charge-coupled device (CCD). The image sensor is optically coupled to the sample and the optical modulator, such that the modulated light illuminates the photodetector. In some embodiments, the photodetector may include a plurality of photodetector elements disposed in a one-dimensional or two-dimensional array.

Block 410 includes determining, based on the first reflected light pulse, a presence of an object in the environment. Determining the presence of objects in the environment may be based on a time of flight measurement. Additionally or alternatively, block 410 may include determining distances to the objects in the environment based on a time of flight measurement.

Block 412 includes determining, based on the second reflected light pulse and the local oscillator signal, a relative speed of the object with respect to the detector. In the case where the photodetector and the laser light source are not moving, the velocity of a moving object may be calculated or approximated as:

$$v_{object} \propto c \left( \frac{f}{f_0} \right),$$

where f is Doppler-shifted frequency of the light reflected or scattered from the moving object and $f_0$ is the optical frequency of the as-emitted laser light pulse. Other ways to determine or calculate a movement rate of the object are possible and contemplated herein.

As described herein, the photodetector may act as a nonlinear mixer configured to mix the received light with the local oscillator signal, which may provide a beat frequency. The method 400 may include determining the beat frequency. Determining the beat frequency may be performed based on an output of a phase-locked loop (PLL), a lock-in amplifier, or a fast Fourier transform (FFT) analysis. Determining the relative speed of the object may be based on the determined beat frequency.

In some embodiments, a read out circuit (e.g., a ROIC) may be coupled to the photodetector. In such scenarios, the read out circuit may perform at least one of: determining the presence of an object in the environment or determining the relative speed of the object with respect to the system.

The ranging pulse and the Doppler pulse may interact with the environment via various types of optical processes. For example, the ranging pulse and/or the Doppler pulse may be absorbed, reflected, or otherwise scattered by objects and/or media in the environment.

Furthermore, when an object moves with respect to the light source, a Doppler shift may be observed in the light scattered from the moving object. For example, the Doppler shift may include a change in the frequency (and corresponding wavelength) of scattered light as compared to the frequency of emitted light. In other words, in scenarios where an object is moving with respect to the light source, at least a portion of the scattered light received by the photodetector may include Doppler-shifted light scattered from the moving object.

The Doppler shift $\Delta f$ may be expressed as:

$$\frac{\Delta f}{f_{source}} \propto \frac{v}{c},$$

where $f_{source}$ is the frequency of emitted light, c is the velocity of light and v is the velocity of the moving object relative to the light source. Accordingly, light scattered from a moving object may be expressed as:

$$S_{object}(t) \propto \sin\left[\pi(f_{source} + \Delta f)t\right].$$

Figure 5:
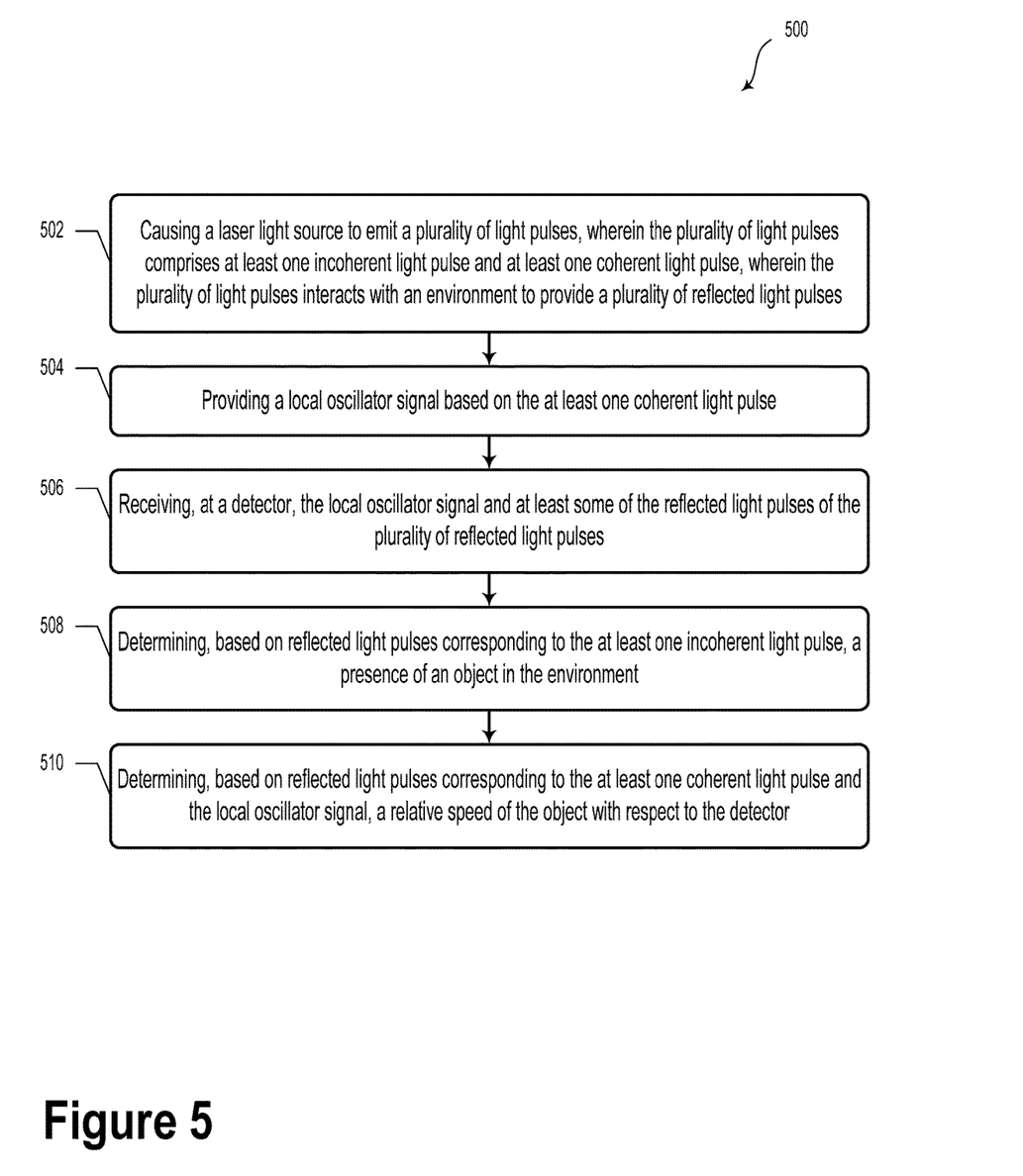
FIG. 5 illustrates a method, according to an example embodiment.

FIG. 5 illustrates a method 500, according to an example embodiment. The method 500 may include various blocks or steps. The blocks or steps may be carried out individually or in combination. The blocks or steps may be carried out in any order and/or in series or in parallel. Further, blocks or steps may be omitted or added to method 500.

The blocks of method 500 may be carried out by various elements of the systems 100 and 200 as illustrated and described in reference to FIGS. 1 and 2. Furthermore, method 500 may involve optical and/or electrical signals similar or identical to signals 300, 340, 350, 362, 364, 368, and 370 that are illustrated and described with regard to FIGS. 3A, 3B, 3C, 3D, and 3E.

Block 502 includes causing a laser light source to emit a plurality of light pulses. The plurality of light pulses may include at least one incoherent light pulse and at least one coherent light pulse. The plurality of light pulses interacts with an environment to provide a plurality of reflected light pulses. The plurality of light pulses may include a pulse train. The pulse train includes an interleaved pattern of coherent light pulses and incoherent light pulses.

The at least one incoherent light pulse includes a ranging pulse. The ranging pulse is between 2 nanoseconds and 5 nanoseconds in duration. The at least one coherent light pulse includes a Doppler pulse. The Doppler pulse is between 125 nanoseconds and 8 microseconds in duration.

Block 504 includes providing a local oscillator signal based on the at least one coherent light pulse. In a homodyne detection mode, the local oscillator signal may include a portion of the unmodulated coherent light pulse. In a heterodyne detection mode, the coherent light pulse may be modulated according to a predetermined reference frequency. In such a scenario, the local oscillator signal may include the modulated coherent light pulse.

Block 506 includes receiving, at a detector, the local oscillator signal and at least some of the reflected light pulses of the plurality of reflected light pulses.

Block 508 includes determining, based on reflected light pulses corresponding to the at least one incoherent light pulse, a presence of an object in the environment.

Block 510 includes determining, based on reflected light pulses corresponding to the at least one coherent light pulse and the local oscillator signal, a relative speed of the object with respect to the detector.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    a photodetector, wherein the photodetector is configured to receive light from an environment of the system;
    a laser light source, wherein the laser light source is configured to emit laser light into the environment, wherein the laser light source is configured to provide a local oscillator signal to the photodetector; and
    a controller, comprising at least one processor and a memory, wherein the at least one processor is configured to execute instructions stored in the memory so as to carry out operations, the operations comprising:
        causing the laser light source to emit a first light pulse, wherein the first light pulse is an incoherent light pulse, wherein the first light pulse interacts with the environment to provide a first reflected light pulse;
        causing the laser light source to emit a second light pulse, wherein the second light pulse is a coherent light pulse, wherein the second light pulse interacts with the environment to provide a second reflected light pulse, and wherein the first light pulse and the second light pulse both form at least a portion of a pulse train, wherein the pulse train comprises an interleaved pattern of coherent light pulses and incoherent light pulses;
        receiving, at the photodetector, the first reflected light pulse, the second reflected light pulse, and the local oscillator signal;
        determining, based on the first reflected light pulse, a presence of an object in the environment; and
        determining, based on the second reflected light pulse and the local oscillator signal, a relative speed of the object with respect to the system.

2. The system of claim 1, further comprising a read out circuit, wherein the read out circuit is coupled to the photodetector, wherein the read out circuit is configured to perform at least one of: determining the presence of an object in the environment or determining the relative speed of the object with respect to the system.

3. The system of claim 1, wherein the photodetector comprises a single photon avalanche detector (SPAD).

4. The system of claim 1, wherein the photodetector comprises a plurality of photodetector elements disposed in a one-dimensional array or a two-dimensional array.

5. The system of claim 1, wherein the laser light source comprises a master optical power amplifier (MOPA) fiber laser, wherein the MOPA comprises a seed laser and a pump laser configured to emit light pulses of at least 15 watts average power and at a wavelength of about 1550 nm.

6. The system of claim 1, wherein the first light pulse comprises a ranging pulse, wherein the ranging pulse is between 2 nanoseconds and 5 nanoseconds in duration.

7. The system of claim 1, wherein the second light pulse comprises a Doppler pulse, wherein the Doppler pulse is between 125 nanoseconds and 8 microseconds in duration.

8. The system of claim 1, wherein the photodetector comprises a nonlinear mixer configured to mix the received light with the local oscillator signal to provide a beat frequency, wherein determining the relative speed of the object is based on determining the beat frequency.

9. The system of claim 8, wherein determining the beat frequency is based on an output of a phase-locked loop (PLL), a lock-in amplifier, or a fast Fourier transform (FFT) analysis.

10. A method, comprising:
   causing a laser light source to emit a first light pulse, wherein the first light pulse is an incoherent light pulse, wherein the first light pulse interacts with an environment to provide a first reflected light pulse;
   causing the laser light source to emit a second light pulse, wherein the second light pulse is a coherent light pulse, wherein the second light pulse interacts with the environment to provide a second reflected light pulse, and wherein the first light pulse and the second light pulse both form at least a portion of a pulse train, wherein the pulse train comprises an interleaved pattern of coherent light pulses and incoherent light pulses;
   providing a local oscillator signal based on the second light pulse;
   receiving, at a photodetector, the first reflected light pulse, the second reflected light pulse, and the local oscillator signal;
   determining, based on the first reflected light pulse, a presence of an object in the environment; and
   determining, based on the second reflected light pulse and the local oscillator signal, a relative speed of the object with respect to the photodetector.

11. The method of claim 10, wherein a read out circuit is coupled to the photodetector, wherein the read out circuit performs at least one of: determining the presence of an object in the environment or determining the relative speed of the object with respect to the photodetector.

12. The method of claim 10, wherein the photodetector comprises a plurality of photodetector elements disposed in a one-dimensional or two-dimensional array.

13. The method of claim 10, wherein the first light pulse comprises a ranging pulse, wherein the ranging pulse is between 2 nanoseconds and 5 nanoseconds in duration.

14. The method of claim 10, wherein the second light pulse comprises a Doppler pulse, wherein the Doppler pulse is between 125 nanoseconds and 8 microseconds in duration.

15. The method of claim 10, wherein the photodetector comprises a nonlinear mixer configured to mix the received light with the local oscillator signal to provide a beat frequency, wherein determining the relative speed of the object is based on determining the beat frequency.

16. The method of claim 15, wherein determining the beat frequency is based on an output of a phase-locked loop (PLL), a lock-in amplifier, or a fast Fourier transform (FFT) analysis.

17. A method, comprising:
   causing a laser light source to emit a plurality of light pulses, wherein the plurality of light pulses comprises at least one incoherent light pulse and at least one coherent light pulse, wherein the plurality of light pulses interacts with an environment to provide a plurality of reflected light pulses, and wherein the plurality of light pulses comprises a pulse train, wherein the pulse train comprises an interleaved pattern of coherent light pulses and incoherent light pulses;
   providing a local oscillator signal based on the at least one coherent light pulse;
   receiving, at a detector, the local oscillator signal and at least some of the reflected light pulses of the plurality of reflected light pulses;
   determining, based on reflected light pulses corresponding to the at least one incoherent light pulse, a presence of an object in the environment; and
   determining, based on reflected light pulses corresponding to the at least one coherent light pulse and the local oscillator signal, a relative speed of the object with respect to the detector.

18. The method of claim 17, wherein the at least one incoherent light pulse comprises a ranging pulse, wherein the ranging pulse is between 2 nanoseconds and 5 nanoseconds in duration.

19. The method of claim 17, wherein the at least one coherent light pulse comprises a Doppler pulse, wherein the Doppler pulse is between 125 nanoseconds and 8 microseconds in duration.

* * * * *